(12) United States Patent
Horiguchi et al.

(10) Patent No.: US 7,527,680 B2
(45) Date of Patent: May 5, 2009

(54) PROJECTION TYPE VIDEO DISPLAY

(75) Inventors: Hirotake Horiguchi, Osaka (JP);
Takeshi Higashino, Kyoto (JP);
Ryosuke Sato, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 681 days.

(21) Appl. No.: 11/230,514

(22) Filed: Sep. 21, 2005

(65) Prior Publication Data

US 2006/0065125 A1 Mar. 30, 2006

(30) Foreign Application Priority Data

Sep. 27, 2004 (JP) ............................. 2004-278743

(51) Int. Cl.
*B01D 46/00* (2006.01)
*B01D 46/46* (2006.01)

(52) U.S. Cl. .............................. 96/422; 96/421; 96/420; 96/417; 96/418; 96/424; 95/1; 95/14; 95/15; 95/17; 95/19; 95/23; 95/25; 95/26; 95/273; 340/607; 345/32; 349/104; 349/105; 349/106; 349/107; 359/308; 359/339; 359/358; 359/588; 359/590; 353/55; 348/273; 55/385.1

(58) Field of Classification Search .................... 96/422, 96/421, 420, 417, 418, 424; 95/1, 14, 15, 95/17, 19, 23, 25, 26, 273; 340/607; 116/DIG. 25; 345/32; 349/104–107; 359/308, 339, 358, 359/588, 590; 353/55; 348/273
See application file for complete search history.

(56) References Cited

U.S. PATENT DOCUMENTS 5,429,649 A * 7/1995 Robin ........................... 96/405
7,261,762 B2 * 8/2007 Kang et al. ....................... 95/1

(Continued)

FOREIGN PATENT DOCUMENTS

JP 03-65544 U 6/1991

(Continued)

OTHER PUBLICATIONS

Chinese Office Action dated May 9, 2008, issued in corresponding Chinese Patent Application No. 200510107536.4.

(Continued)

*Primary Examiner*—Duane Smith
*Assistant Examiner*—Minh-Chau T Pham
(74) *Attorney, Agent, or Firm*—Westerman, Hattori, Daniels & Adrian, LLP.

(57) ABSTRACT

Data of a barometric pressure that a barometric pressure sensor outputs, and data of an air volume that an air-volume sensor outputs are input into a system control circuit. The system control circuit is provided with a table storing portion. In the table storing portion, a control table is stored. The control table is formed of a plus supplied-voltage value to fan power set by a barometric pressure value and an air-volume value, and a warning instruction. In a case that the warning instruction is selected based on the barometric pressure value and the air-volume value, the system control circuit turns on a warning-use LED so as to inform a user that a filter is clogged.

2 Claims, 3 Drawing Sheets

U.S. PATENT DOCUMENTS

2002/0118160 A1    8/2002   Nakamura

FOREIGN PATENT DOCUMENTS

| JP | 09-225251 A | 9/1997 |
|---|---|---|
| JP | 2000-153121 A | 6/2000 |
| JP | 2001-209125 A | 8/2001 |
| JP | 2001-222065 | 8/2001 |
| JP | 2002-062589 A | 2/2002 |
| JP | 2002-258237 A | 9/2002 |
| JP | 2003-005289 A | 1/2003 |

OTHER PUBLICATIONS

Office Action dated Mar. 13, 2007 issued in corresponding Japanese Patent Application No. 2004-278743.

European Search Report dated Dec. 30, 2005 issued in corresponding European Application No. 05020843.8.

* cited by examiner

FIG. 3

| BAROMETRIC PRESSURE (hPa) | AIR VOLUME (m³/s) / AIR VOLUME SENSOR OUTPUTTING VALUE (V) | | | | | |
|---|---|---|---|---|---|---|
| | 3.33~2.51 / 5~4 | 2.50~2.20 / 4~3.5 | 2.19~2.06 / 3.5~3.1 | 2.05~1.91 / 3.1~2.9 | 1.90~1.66 / 2.9~2.6 | 1.65~ / 2.6~ |
| 1013~967 | 0 | 1 | 2 | 3 | 5 | warning |
| 966~900 | 1 | 2 | 3 | 4 | 6 | warning |
| 899~834 | 2 | 3 | 4 | 5 | warning | warning |
| 833~767 | 3 | 4 | 5 | warning | warning | warning |
| 766~679 | 4 | 5 | warning | warning | warning | warning |
| 678~ | 5 | warning | warning | warning | warning | warning |

PROJECTION TYPE VIDEO DISPLAY

BACKGROUND OF THE INVENTION

Field of the Invention

The present invention relates to a projection type video display such as a liquid crystal projector, etc.

Because of a configuration in which light emitted from a light source is modulated by a light valve such as a liquid crystal panel, etc., and the light is projected, a projection type video display needs to be provided with a high-intensity light source. For this, it is needed to prepare measures against heat generated from the high-intensity light source itself, or heat generated at a time that the light is absorbed by a polarizer of a liquid crystal panel or various kinds of optical components. From the past, an intake and exhaust are performed by rotating a cooling fan by a motor so as to release the heat to outside the video display (see Japanese Patent Laying-open No. 2001-222065).

Incidentally, in a case of taking in outside air into the video display for cooling, a filter is provided at an air-intake port for removing a dust in the outside air, and if the filter is clogged, an appropriate cooling control cannot be realized.

SUMMARY OF THE INVENTION

In view of the above circumstance, it is an object of the present invention to provide a projection type video display capable of informing a user of a state that a filter is clogged, and therefore, an appropriate cooling control cannot be performed.

In order to solve the above-described problem, a projection type video display according to the present invention is a projection type video display for applying an optical modulation to light emitted from a light source by a light valve, and projecting image light obtained by this optical modulation, and comprises an air-cooling means for cooling inside the display by air, a filter provided at an outside-air intake port, an air-volume sensor for detecting a volume of air drawn from the outside-air intake port, and a warning-outputting means for outputting a warning informing that the filter is clogged based on air-volume data from the air-volume sensor.

How far the filter is clogged (an extent of clogging) appears in air-volume data from an air-volume sensor. The warning-outputting means outputs a warning informing that the filter is clogged based on the air-volume data from the air-volume sensor. This makes it possible to inform a user of a state that the filter is clogged, and therefore, an appropriate cooling control cannot be performed.

A projection type video display of the above configuration comprises a barometric pressure sensor for detecting a barometric pressure, in which the warning outputting means may output the warning based on the air-volume data and barometric pressure data. In addition, a projection type video display of these configurations may be configured such that an outputting condition of the warning differs depending on an outside temperature.

The present invention exhibits an effect in that a user is informed of a state that the filter is clogged, and thus, an appropriate cooling control cannot be performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a descriptive diagram showing contents of a table that a liquid crystal projector of an embodiment of the present invention stores.

DESCRIPTION OF THE PREFERRED EMBODIMENTS

Hereinafter, a liquid crystal projector of an embodiment of the present invention will be described based on FIG. 1 to FIG. 3.

Figure 1:
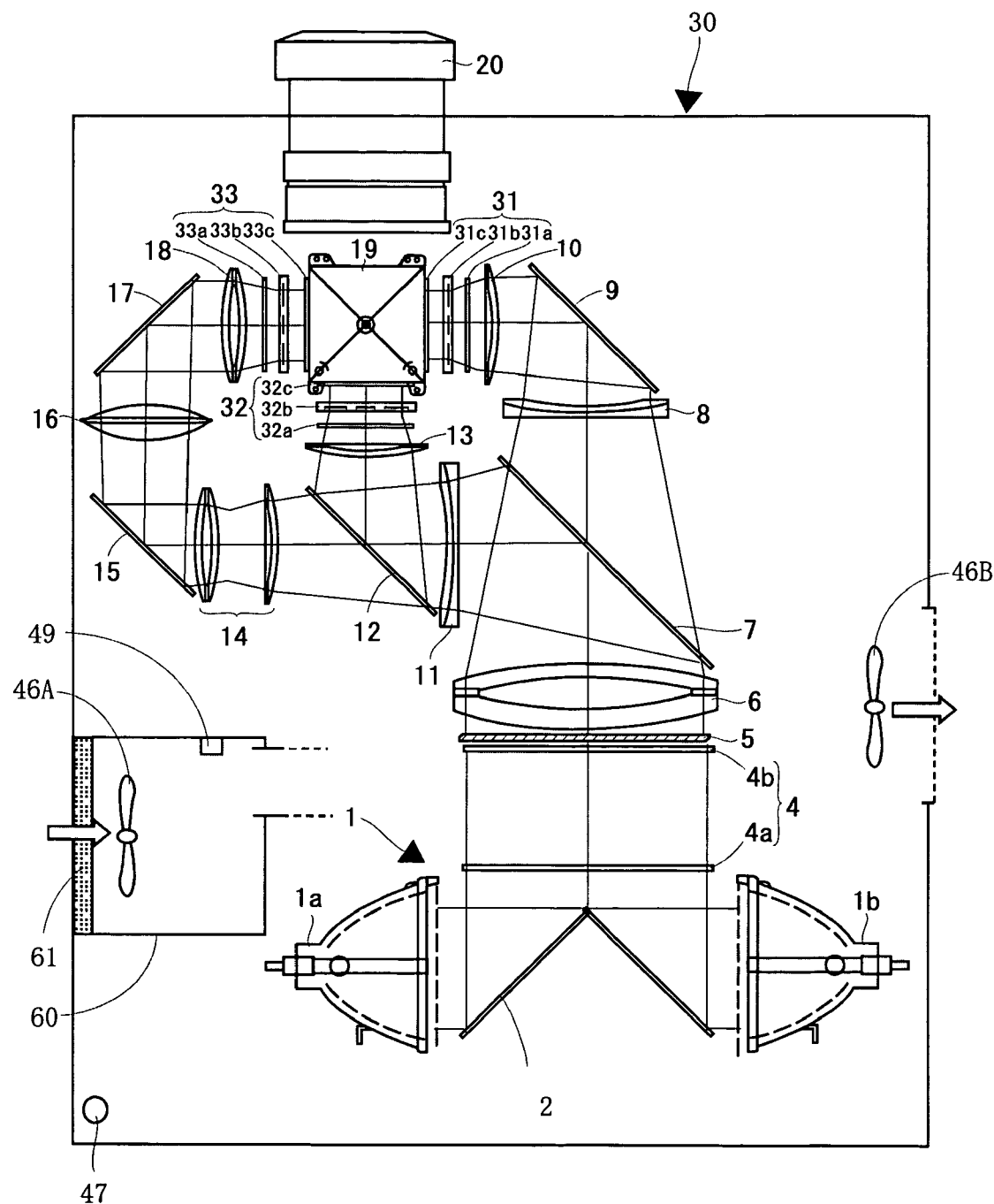
FIG. 1 is a block diagram showing an optical system of a liquid crystal projector, etc., of an embodiment of the present invention.

FIG. 1 is a diagram showing an optical system of a liquid crystal projector 30, etc., of this embodiment. An illuminating device 1 is formed of a first lamp 1a, a second lamp 1b, and a mirror 2 arranged between the lamps 1a, 1b. Each lamp is formed of an ultra-high pressure mercury lamp, a metal halide lamp, a xenon lamp, etc., and its irradiated light is collimated by a parabolic reflector before being exited therefrom. The exited light is introduced to an integrator lens 4.

The integrator lens 4 is constituted of a pair of fly's eye lenses 4a, 4b, and each pair of the lenses introduces light emitted from the illuminating device 1 to an entire surface of a liquid crystal display panel described later. In addition, the integrator lens 4 evens off partial luminance non-uniformity existing in the illuminating device 1, and decreases a difference between a light amount in a screen (panel) center and that on a peripheral side. The light that passes through the integrator lens 4 passes through a polarization conversion system 5 and a condenser lens 6, and thereafter, is introduced to a first dichroic mirror 7.

The polarization conversion system 5 is constituted of a polarization beam splitter array (Hereinafter, referred to as a PBS array). The PBS array is provided with a polarized light separating surface, and a retardation plate (1/2λ plate). Each polarized light separating surface of the PBS array transmits P-polarized light, for example, out of light from the integrator lens 4, and changes an optical path of S-polarized light by 90 degrees. The S-polarized light having the optical path changed is reflected by an adjacent polarized light separating surface, and is directly exited therefrom. On the other hand, the P-polarized light that passed through the polarized light separating surface is converted into the S-polarized light by the retardation plate provided on a front side (light-exit side) of the retardation plate, and is exited therefrom. That is, in this case, approximately all light is converted into the S-polarized light.

The first dichroic mirror 7 transmits light in a red wavelength band, and reflects light in a cyan (green +blue) wavelength band. The light in a red wavelength band passing through the first dichroic mirror 7 enters a concave lens 8, and is reflected by a reflection mirror 9. As a result, an optical path is changed. The light of red color reflected by the reflection mirror 9 enters a lens 10, and passes through a red color-use transmission-type liquid crystal display panel 31. As a result, the light of red color is optically modulated. On the other hand, light in a cyan wavelength band reflected by the first dichroic mirror 7 enters a concave lens 11, and thereafter, is introduced to a second dichroic mirror 12.

The second dichroic mirror 12 transmits light in a blue wavelength band, and reflects light in a green wavelength band. The light in a green wavelength band reflected by the second dichroic mirror 12 enters a lens 13, and thereafter, is introduced to a green color-use transmission-type liquid crystal display panel 32. As a result of passing therethrough, the light in a green wavelength band is optically modulated. In addition, the light in a blue wavelength band passing through the second dichroic mirror 12 enters a relay lens 14, a reflection mirror 15, a relay lens 16, a reflection mirror 17 and a relay lens 18, and thereafter, is introduced to a blue color-use transmission-type liquid crystal display panel 33. As a result of passing therethrough, the light in a blue wavelength band is optically modulated.

Each liquid crystal display panel 31, 32, or 33 is formed of being provided with incidence-side polarizers 31a, 32a, and 33a, panel portions 31b, 32b, and 33b formed by sealing liquid crystal between a pair of glass plates (on which a pixel electrode and an alignment film are formed), and exit-side polarizers 31c, 32c, and 33c.

The modulated light (image light of respective colors) modulated by passing through the liquid crystal display panels 31, 32, and 33 is combined by a cross dichroic prism 19, and as a result, is changed to full-color image light. This full-color image light is projected by a projection lens 20, and displayed on a screen not shown.

A duct 60 is arranged inside a main body of the liquid crystal projector 30. The duct 60 is connected to an air-intake port formed on a side surface of the main body, for example. In addition, at the air-intake port, a filter 61 for removing dust in outside air is mounted. Furthermore, inside the duct 60, an intake fan 46A is provided, so that the outside air is drawn inside the main body. The drawn outside air passes through the duct 60, and is blown onto an object (the lamp, the liquid crystal display panel, etc.) to be cooled.

Inside the duct 60, an air-volume sensor (air-current amount sensor) 49 is provided. For the air-volume sensor 49, a Coriolis mass current-velocity sensor, a swirl-type air-current amount sensor, a sensor for detecting an air current amount by measuring a temperature distribution changing depending on a current of winds or air, etc., may be used. Furthermore, a barometric pressure sensor 47 (see FIG. 2, too) is provided on an outside of the duct 60, which is within the main body of the liquid crystal projector 30. For the barometric pressure sensor 47, a sensor using a semiconductor pressure-sensitive element may be adopted, for example.

Furthermore, on a side surface, for example, of the main body of the liquid crystal projector 30, an exhaust port is provided, and in the vicinity of this exhaust port, an exhaust fan 46B is provided. The exhaust fan 46B exhausts air inside the main body of the liquid crystal projector 30 to outside the main body.

Figure 2:
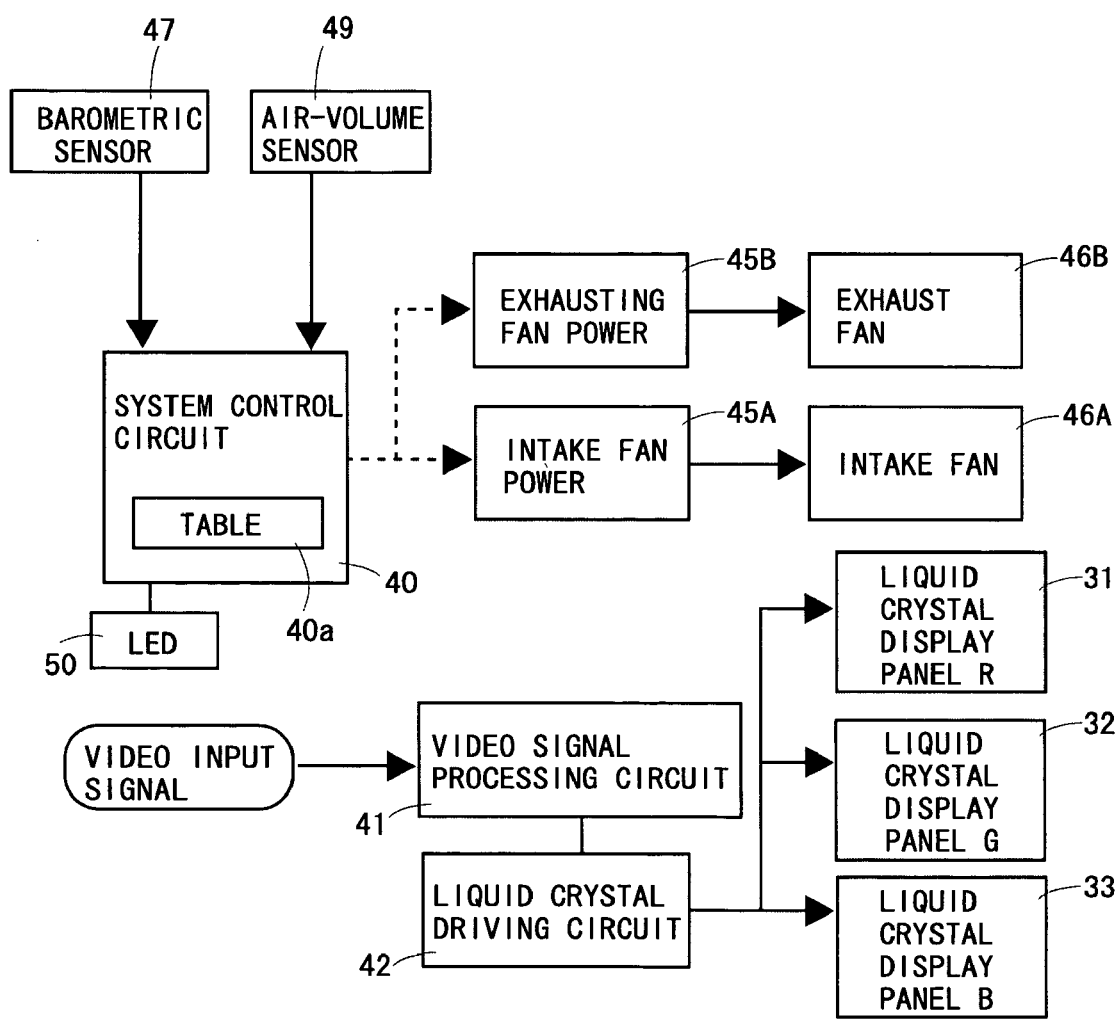
FIG. 2 is a block chart showing a fan control system of a liquid crystal projector of an embodiment of the present invention.

FIG. 2 is a block chart showing a video process system and a fan control system in the liquid crystal projector 30. A video signal processing circuit 41 inputs a video signal, and subjects the input signal to a frequency conversion (conversion of the number of scanning lines), a gamma correction process in view of added voltage—light-transmissible characteristic of the liquid crystal display panel, and other processes, and applies this corrected video signal (video data) to the liquid crystal driving circuit 42. The liquid crystal driving circuit 42 drives the liquid crystal display panels 31, 32, and 33 based on the video signal. A system control circuit 40 controls operations of an intake fan power 45A, an exhaust fan power 45B, etc. The intake fan power 45A supplies power to the intake fan 46A. The exhaust fan power 45B supplies power to an exhaust fan 46B.

Barometric pressure data that the barometric pressure sensor 47 outputs is input into the system control circuit 40, and air-volume data that the air-volume sensor 49 outputs, too, is input into the system control circuit 40. The system control circuit 40 is provided with a table storing portion (a memory) 40a. In the table storing portion 40a, a control table shown in FIG. 3 is stored. The control table defines an added voltage value to the fan power set by a barometric pressure value and an air-volume value. The voltage value to be added is voltage added to a normally set voltage value, and in this embodiment, is set within a range from 0 (zero) to 6 V (volts). The normally set voltage value is fan driving voltage read-out from a table not shown based on a temperature detected by a temperature sensor not shown, for example. In this case, the added voltage value is added to a voltage value that is determined by the outside temperature and supplied to the fan power.

If the air-volume data (voltage value) of the air-volume sensor 49 is low, this indicates that the filter 61 is clogged, and thus, a current of the air inside the duct 60 becomes weak. In addition, if the barometric pressure is low, this indicates that although the speed of rotations of the fans is the same, a force of wind becomes weak because the air becomes thin. That is, the lower the air volume, and the lower the barometric pressure, the larger the added voltage is set. In a case of the control table illustrated in FIG. 3 as an example, if the air volume is from 1.90 m$^3$/s to 1.66 m$^3$Is, and the barometric pressure value is from 966 hPa (hectopascals) to 900 hPa (hectopascals), for example, 6 V (volts) are added to the normally set voltage value. The system control circuit 40 supplies to the control table measured air-volume data and barometric pressure data (both are digital data) as a reading-out address. Then, the voltage value to be added regarding the fan power is read out from the control table. The system control circuit 40 drives the fan based on the voltage value in which the voltage value to be added is added to the normally set voltage value.

Furthermore, in a range considered to be not capable of performing a sufficient cooling because both the air volume and the barometric pressure are low (in areas in which a "warning" is written on the control table in FIG. 3), the system control circuit 40 is to issue a warning. The warning is issued by blinking a LED 50 provided on an operating panel (not shown), for example. It is, of course, possible to exhibit a warning display on a message-use display panel, or to issue a warning sound by a buzzer, etc. In addition, it may be also possible to perform a control for automatically turning-off the lamp when a predetermined time period (10 seconds, for example) is elapsed after the warning is issued.

Herein, the liquid crystal projector 30 is provided with a temperature sensor not shown, and the system control circuit 40 may select one control table out of a plurality of the control tables based on temperature data from this sensor. Provided that the control table shown in FIG. 3 is a table to be selected when the outside temperature is within a range of 27 degrees centigrade to 30 degrees centigrade, and in addition, on the table to be selected when the outside temperature is within a range of 25 degrees centigrade to 27 degrees centigrade, the "warning" may be set under a condition that the air volume is from 1.90 m$^3$/s to 1.66 m$^3$/s, and the barometric pressure value is from 966 hPa (hectopascals) to 900 hPa (hectopascals), for example. That is, an outputting condition of the warning may differ depending on the outside temperature.

It is noted that in the above-described embodiment, a three-panel liquid crystal projector using the liquid crystal display panel is shown. However, the present invention is applicable to a liquid crystal projector, etc., provided with another image light generating system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display for applying an optical modulation to light emitted from a light source by a light valve, and projecting image light obtained by this optical modulation, comprising:
   an air-cooling means for cooling the inside of the display by air;
   a filter provided at an outside-air intake port;
   a duct connected to the outside-air intake port;
   an air-current amount sensor for detecting the volume of air drawn from the outside-air intake port, the air-current amount sensor being provided in the duct;
   a barometric pressure sensor for detecting atmosphere pressure, the barometric pressure sensor being provided outside the duct;
   a memory for storing a table in which warning instructions determined by an air-current amount value and an atmosphere pressure value and control contents concerning a cooling power of the air-cooling means determined by the air-current amount value and the atmosphere pressure value are defined; and
   a controller for reading information from the table based on an air-current amount value detected by the air-current amount sensor and an atmosphere pressure value by the barometric pressure sensor and generating a warning signal when the information read from the table is a warning instruction.

2. The projection type video display according to claim 1, wherein the warning-outputting condition differs depending on outside temperature.

* * * * *